United States Patent
Renes et al.

(10) Patent No.: US 12,177,363 B2
(45) Date of Patent: Dec. 24, 2024

(54) FAULT COUNTERMEASURES FOR DIGITAL SIGNATURES WITH ABORTS

(71) Applicant: NXP B.V., Eindhoven (NL)

(72) Inventors: Joost Roland Renes, Eindhoven (NL); Melissa Azouaoui, Norderstedt (DE); Joppe Willem Bos, Wijgmaal (BE); Björn Fay, Brande-Hörnerkirchen (DE); Tobias Schneider, Graz (AT)

(73) Assignee: NXP B.V., Eindhoven (NL)

( * ) Notice: Subject to any disclaimer, the term of this patent is extended or adjusted under 35 U.S.C. 154(b) by 294 days.

(21) Appl. No.: 18/045,702

(22) Filed: Oct. 11, 2022

(65) Prior Publication Data
US 2024/0146535 A1 May 2, 2024

(51) Int. Cl.
  H04L 29/06 (2006.01)
  G06F 21/52 (2013.01)
  H04L 9/30 (2006.01)
  H04L 9/32 (2006.01)

(52) U.S. Cl.
  CPC .......... H04L 9/3247 (2013.01); G06F 21/52 (2013.01); H04L 9/3093 (2013.01); H04L 9/3271 (2013.01)

(58) Field of Classification Search
  CPC ... H04L 9/3247; H04L 9/3093; H04L 9/3271; G06F 21/52
  See application file for complete search history.

(56) References Cited

U.S. PATENT DOCUMENTS

2020/0153640 A1* 5/2020 Ranellucci ............ H04L 9/3255

FOREIGN PATENT DOCUMENTS

EP 3461053 A1 * 3/2019 ............ H04L 63/12

OTHER PUBLICATIONS

U.S. Appl. No. 17/938,564; filed: Oct. 6, 2022; Inventor: Melissa Azouaoui et al.; Title: "Fault Detection in Post-Quantum Cryptography;".
U.S. Appl. No. 18/066,862; filed: Dec. 15, 2022; Inventor: Bjorn Fay et al.; Title: "Efficient Fault Countermeasure Through Polynomial Evaluation;".
Bar-El, Hagai et al.; "The Sorcerer's Apprentice Guide to Fault Attacks"; Proceedings of the IEEE ( vol. 94, Issue 2, Feb. 2006); Publication Date: Jan. 23, 2006; DOI: 10.1109/JPROC.2005.862424.
Ravi, Prasanna et al.; "Side-channel and Fault-injection attacks over Lattice-based Post-quantum Schemes (Kyber, Dilithium): Survey and New Results"; IACR International Association for Cryptologic Research; Cryptology ePrint Archive, Paper 2022/737; vol. 20220609:065932; https://eprint.iacr.org/2022/737.

(Continued)

*Primary Examiner* — Shawnchoy Rahman (57) ABSTRACT

Various embodiments relate to a fault detection system and method for a digital signature algorithm, including: producing a digital signature of a message using a digital signature algorithm; storing parameters from a last round of the digital signature algorithm; executing the last round of the digital signature algorithm using the stored parameters to produce a check signature; comparing the digital signature to the check signature; and outputting the digital signature when the digital signature is the same as the check signature.

26 Claims, 2 Drawing Sheets

(56) References Cited

OTHER PUBLICATIONS

Christopher Ambrose, Joppe W. Bos, Bjorn Fay, Marc Joye, Manfred Lochter, and Bruce Murray, Differential attacks on deterministic signatures, Topics in Cryptology CT-RSA 2018 (Cham) (Nigel p. Smart, ed.), Springer International Publishing, 2018, pp. 339-353.

P.E. Beckmann and B.R. Musicus, Fast fault-tolerant digital convolution using a polynomial residue number system, IEEE Transactions on Signal Processing 41 (1993), No. 7, 2300-2313.

Nina Bindel, Johannes Buchmann, and Juliane Kramer, Lattice-based signature schemes and their sensitivity to fault attacks, 2016 Workshop on Fault Diagnosis.

Thomas Espitau, Pierre Alain Fouque, Benoit Gerard, and Mehdi Tibouchi, Loopabort faults on lattice-based fiat-shamir and hash-and-sign signatures, Selected Areas In Cryptography- SAC 2016—23rd International Conference, St. John's, NL, Canada, Aug. 10-12, 2016, Revised Selected Papers (Roberto Avanzi and Howard M. Heys, eds.), Lecture Notes in Computer Science, vol. 10532, Springer, 2016, pp. 140-158.

Leon Groot Bruinderink and Peter Pessl, Differential Fault Attacks on Deterministic Lattice Signatures, IACR Transactions on Cryptographic Hardware and Embedded Systems 2018 (2018), No. 3, 21-43.

Saad Islam, Koksal Mus, Richa Singh, Patrick Schaumont, and Berk Sunar, Signature correction attack on dilithium signature scheme, arXiv (2022), https: //arxiv. org/abs/2203.00637.

Vadim Lyubashevsky, Leo Ducas, Eike Killz, Tancrede Lepoint, Peter Schwabe, Gregor Seiler, Damien Stehle, and Shi Bai, CRYSTALS-DILITHIUM, Tech. report, National Institute of Standards and Technology, 2020, available at https: / / csrc.nist.gov/projects/post-quantum-cryptography/round-3-submissions.

Daniel Heinz and Thomas Poppelmann, Combined fault and DPA protection for attice-based cryptography, IACR Cryptol. ePrint Arch. (2021), 101, https: //eprint. acr.org/2021/101.

National Institute of Standards and Technology, Post-quantum cryptography standardization, https: / / csrc. nist . gov /Pro j acts/Post-Quantum-Cryptography/Post-Quantum-Cryptography-Standardization.

Ausmita Sarker, Mehran Mozaffari Kermani, and Reza Azarderakhsh, Error detection architectures for ring polynomial multiplication and modular reduction of ring-lwe in $Z/pZ[x]/x^n+1$ benchmarked on asic, IEEE Transactions on Reliability 70 (2021), No. 1, 362-370.

Ausmita Sarker, Mehran Mozaffari-Kermani, and Reza Azarderakhsh, Hardware constructions for error detection of number-theoretic transform utilized in secure cryptographic architectures, IEEE Transactions on Very Large Scale Integration (VLSI) Systems 27 (2019), No. 3, 738-741.

F. S. Vainstein, Low redundancy polynomial checks for numerical computation, Appl. Algebra Eng., Commun. Comput. 7 (1996), No. 6, 439-447.

Keita Xagawa, Akira Ito, Rei Ueno, Junko Takahashi, and Naolumi Homma, Faultinjection attacks against nist's post-quantum cryptography round 3 KEM candidates, Advances in Cryptology—ASIACRYPT 2021—27th International Conference on the Theory and Application of Cryptology and Information Security, Singapore, Dec. 6-10, 2021, Proceedings, Part II; 27.

* cited by examiner

FIG. 1

FIG. 2

FAULT COUNTERMEASURES FOR DIGITAL SIGNATURES WITH ABORTS

TECHNICAL FIELD

Various exemplary embodiments disclosed herein relate generally to fault countermeasures for digital signatures with aborts.

BACKGROUND

Fault attacks may be used to break digital signature schemes. An attacker injects faults into the digital signature scheme as certain points and them may use the results to derive secret information. Thus, the digital signature scheme may be compromised.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a data processing system including instructions embodied in a non-transitory computer readable medium, the instructions for a fault detection in a digital signature algorithm in a processor, the instructions, including: producing a digital signature of a message using a digital signature algorithm; storing parameters from a last round of the digital signature algorithm; executing the last round of the digital signature algorithm using the stored parameters to produce a check signature; comparing the digital signature to the check signature; and outputting the digital signature when the digital signature is the same as the check signature.

Various embodiments are described, wherein the instructions further include: outputting an error when the digital signature is not the same as the check signature.

Various embodiments are described, wherein the stored parameters include a round counter and a seed.

Various embodiments are described, wherein the signature algorithm is a Dilithium digital signature algorithm.

Various embodiments are described, wherein the instructions further include: performing an integrity check on one or more steps of the execution of the last round of the digital signature algorithm.

Various embodiments are described, wherein performing an integrity check includes re-computing a hash digest of the message.

Various embodiments are described, wherein performing an integrity check includes storing cyclic redundancy checks of matrix elements used in the digital signature algorithm.

Various embodiments are described, wherein performing an integrity check includes recomputing an ephemeral secret using the stored parameters of a round counter and a seed.

Various embodiments are described, wherein performing an integrity check includes re-computing a challenge.

Various embodiments are described, wherein performing an integrity check includes re-computing a polynomial representation of a challenge.

Various embodiments are described, wherein performing an integrity check includes preventing loop abort faults.

Various embodiments are described, wherein performing an integrity check includes preventing general instruction skipping.

Various embodiments are described, wherein executing the last round of the digital signature algorithm using the stored parameters to produce a check signature is executed multiple times to produce multiple check signatures, comparing the digital signature to the check signature is repeated multiple times for each of the multiple check signatures, and outputting the digital signature when the digital signature is the same as the check signature includes outputting the digital signature when the digital signature is the same as each of the multiple check signatures.

Further various embodiments relate to a fault detection method for a digital signature algorithm, including: producing a digital signature of a message using a digital signature algorithm; storing parameters from a last round of the digital signature algorithm; executing the last round of the digital signature algorithm using the stored parameters to produce a check signature; comparing the digital signature to the check signature; and outputting the digital signature when the digital signature is the same as the check signature.

Various embodiments are described, further including: outputting an error when the digital signature is not the same as the check signature.

Various embodiments are described, wherein the stored parameters include a round counter and a seed.

Various embodiments are described, wherein the signature algorithm is a Dilithium digital signature algorithm.

Various embodiments are described, further including: performing an integrity check on one or more steps of the execution of the last round of the digital signature algorithm.

Various embodiments are described, wherein performing an integrity check includes re-computing a hash digest of the message.

Various embodiments are described, wherein performing an integrity check includes storing cyclic redundancy checks of matrix elements used in the digital signature algorithm.

Various embodiments are described, wherein performing an integrity check includes recomputing an ephemeral secret using the stored parameters of a round counter and a seed.

Various embodiments are described, wherein performing an integrity check includes re-computing a challenge.

Various embodiments are described, wherein performing an integrity check includes re-computing a polynomial representation of a challenge.

Various embodiments are described, wherein performing an integrity check includes preventing loop abort faults.

Various embodiments are described, wherein performing an integrity check includes preventing general instruction skipping.

Various embodiments are described, wherein executing the last round of the digital signature algorithm using the stored parameters to produce a check signature is executed multiple times to produce multiple check signatures, comparing the digital signature to the check signature is repeated multiple times for each of the multiple check signatures, and outputting the digital signature when the digital signature is the same as the check signature includes outputting the digital signature when the digital signature is the same as each of the multiple check signatures.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Fault attacks on post-quantum signatures such as Dilithium are a significant issue, as even single bit-flips can lead to key recovery attacks. Countermeasures include additional computation on redundant data.

Fault injection attacks are a major problem for implementations of digital signature algorithms, in particular for deterministic versions of these algorithms. This has led to practical fault attacks on deterministic versions of elliptic curve digital signature algorithm (ECDSA) and Edwards-curve Digital Signature Algorithm (EdDSA). The main idea of these attacks is simple: if a signing party generates a correct signature σ over a given message m, and another signature σ' over the same message but with a fault introduced during the signing procedure, then the pair σ and σ' leads to knowledge about the secret key. The underlying issue is similar for elliptic-curve-based digital signatures as they are constructed as sigma protocols combined with the Fiat-Shamir paradigm consisting of a commitment, challenge and response which all mimic the Schnorr sigma and digital signature construction. An EdDSA signature (R,S) includes a commitment point R, and relies on a challenge t=H(R∥A∥H(m)) to generate the response S=r+ts, where s is the long-term secret key, A is the long-term public key, and r the ephemeral secret (which is the discrete log of R). Any fault in the computation of t' leads to a faulty signature (R, S') and an attacker may retrieve $$s = \frac{S' - S}{t' - t}$$

with only a single fault.

The countermeasures to this fault attack are two-fold. Firstly, one can add randomness during the generation of the commitment. However, this makes the signature scheme randomized and is not applicable if a deterministic scheme is desirable. If a deterministic signature scheme is required, explicit fault protection is necessary. This may include redundant computation, for example generating the challenge twice and verifying that the result is the same. It would also include hardening the hash computations themselves, as faults do not only occur during the arithmetic operations. This results in significant computational overhead, impacting the efficiency of the algorithms.

The well-known fault attacks on Fiat-Shamir-based classical digital signatures carry over to post-quantum digital signatures based on Fiat-Shamir. The most pronounced example is Dilithium which the National Institute of Standards and Technology has announced will become a standard. Although the description herein focuses on Dilithium, the scope extends more broadly to any signature scheme with a Fiat-Shamir-with-aborts structure. The Dilithium signature scheme works similarly to a sigma protocol by generating a commitment $w_1$=HighBits(Ay, $2\gamma_2$), where A is a matrix of polynomials in $\mathbb{F}_q[X]/(X^n+1)$ for a prime $q=2^{23}-2^{13}+1$ and $n=256$, and y is a polynomial with coefficients in $[-\gamma_1-1, \gamma_1]$ for $\gamma_1=2^{17}$ or $\gamma_1=2^{19}$. The polynomial y is either deterministically generated based on part of the secret key and message digest, or randomly generated. The first is called the deterministic variant of Dilithium, the latter the randomized variant.

As usual, the challenge c is generated with the Fiat-Shamir paradigm as (a small derivation of) H (m∥$w_1$) by hashing the message m with the commitment $w_1$. The response includes the (seed of the) challenge, some public "hint vector" that is not relevant to the secret key, and the value $z=y+cs_1$ if $$\|z\|_\infty < \gamma_1"\beta, \qquad (1)$$

where β is a public constant and $s_1$ is a vector of secret polynomials. There is a second range check that is ignored for now to explain the idea. As was the case for ECDSA and EdDSA, for a deterministic signature introducing a fault in the computation before c leads to two signatures $z=y+cs_1$ and $z'=y+c's_1$ such that $$z-z'=(c-c')s_1. \qquad (2)$$

Assuming that c−c' is an invertible polynomial, this immediately leads to recovery of the secret $s_1$.

A crucial element of the signature scheme, and what is different from ECDSA and EdDSA, is the range check $\|z\|_\infty < \gamma_1-\beta$. If this check is passed (and some other checks), the value z is released as part of the signature and the algorithm is completed. If this range check fails, the response computation is aborted, the commitment and challenge are discarded and the operations are repeated starting from generating y with an incremented counter. This causes the signature scheme to have a variable signing time. Each such attempt at computing a signature is called a round of the signature generation. On average, Dilithium requires 3-5 rounds depending on the parameter set, but if many signatures are required then even 10 or 20 rounds will be observed with non-negligible probability.

The countermeasures for Dilithium are essentially the same as for other Fiat-Shamir-based signatures: for randomized signatures the value of y will be different for each signature so Equation (2) does not hold. For the deterministic variant faults have to be explicitly detected by adding redundant computations and verifying equality at the end. For example, by computing the signature twice and ensuring the end result is the same. This countermeasure results in a 2× slowdown of the signing operation. Another possible approach is to verify an output signature by using the regular signature verification algorithm.

An embodiment of a digital signature fault detection method will now be described that provides countermeasures against fault attacks. It may be observed that if the range check from Equation (1) fails, then if a fault was injected, a faulted value z' will not be publicly released. Therefore, even for deterministic signatures the relation in Equation (2) cannot be exploited. As a result, it is only necessary to ensure the released signature in the final round of Dilithium is not faulty. It is proposed to initially include a set of lightweight fault countermeasures, only guaranteeing correct control flow but not protecting data itself (which is the most expensive). Because Dilithium is fairly expensive in itself, such lightweight countermeasures will have only negligible overhead on the total computation time. Once a candidate signature passes the range checks from Equation (1), a strong integrity check on the final round (e.g., completely re-compute it) is performed, and the signature is only released when this returns the same result. This is significantly more efficient than applying the strong fault countermeasure on each of the rounds, and the resulting total benefit depends on the number of rounds required for a signing operation. The overhead for 1-5 rounds is summarized in Table 1, noting that the overhead for the lightweight countermeasure only reduces further with more rounds.

TABLE 1

| #rounds | 1 | 2 | 3 | 4 | 5 |
|---|---|---|---|---|---|
| 1 X overhead in a single round | | | | | |
| Full | 1 | 1 | 1 | 1 | 1 |
| Lightweight | 1 | 0.5 | 0.33 | 0.25 | 0.2 |
| 0.5 X overhead in a single round | | | | | |
| Full | 0.5 | 0.5 | 0.5 | 0.5 | 0.5 |
| Lightweight | 0.5 | 0.25 | 0.17 | 0.13 | 0.1 |
| 0.25 X overhead in a single round | | | | | |
| Full | 0.25 | 0.25 | 0.25 | 0.25 | 0.25 |
| Lightweight | 0.25 | 0.13 | 0.09 | 0.06 | 0.05 |

Embodiments of the digital signature will now be described in more detail. The signature generation algorithm of Dilithium is described in Algorithm 1 below. At Line 1, a matrix A is generated. Rather than storing A as part of the public key, instead a randomly generated seed $\rho$ is stored as part of the public key, and then $\rho$ is used with a pseudorandom number generator to generate the matrix A. At Line 2, the value tr, which is a hash of the public key, is concatenated with the message M and then hashed. At Line 3, the value $\kappa$ is initialized to 0, and the signature (z,h) is set to null $\perp$. Then at Line 4, the value $\rho'$ (which provides randomness to the signature) is either set based upon a hash the concatenated values of K, which is part of the secret key, and $\mu$, or the value $\rho'$ is set randomly. The while loop starts in Line 5 and runs until Line 19, where the counter $\kappa$ is increased in case of failure. Each iteration of the while loop staring at Line 5 is a round. Each of the rounds are independent of one another. The while loop condition at Line 5 determines if the signature (z, h) is null (the value to which the signature is initialized in Line 3). Once a valid signature is found, it is returned, and the loop terminates. The rejection check on z is done in Line 13, where the algorithm returns to Line 5 if any of the coefficients of any of the polynomials in the vector Z are $\geq \gamma_1 - \beta$. This is to prevent the leaking of information regarding he secret key by checking that the signature generated is independent of the secret key. For reference, the parameters of the different Dilithium security levels are illustrated in Table 2, though the exact values are provided as an example. Similarly, the algorithm returns from Line 13 to Line 5 if any of the coefficients of any of the polynomials in the vector $r_0$ is $\geq \gamma_2 - \beta$ or if $\|z\|_\infty \geq \gamma_1 - \beta$. As $r_0$ is never released as part of the signature (not even a successful one), it is not as easy to exploit. Although values could be leaked when combining fault attacks with side-channel attacks, faults are only focused on here.

At Line 6, the seed $\rho'$ and round counter $\kappa$ is used to generate an ephemeral secret y. So with each iteration the ephemeral secret y changes. The ExpandMask function may be a hash function, for example Shake-256, but other functions may be used as well. At line 7, the value w is produced by multiplying A by y. At line 8, the high bits of w are selected to create the commitment $w_1$. The challenge $\tilde{c}$ it then calculated at Line 9 by hashing $\mu \| w_1$. Line 10 converts the challenge $\tilde{c}$ into a polynomial representation using c. At line 11, part of the signature z is calculated using $s_1$ which is part of the secret key. At line 12, $r_0$ is calculates using $s_2$ which is part of the secret key. Then at Line 13 the values of z and $r_0$ are checked to be within a desired range to limit their dependence on the secret key, and if they are not in the proper range the signature (z, h) is reset to null $\perp$. If z in in the proper range, then the hint h is calculated to help a verifier to verify the signature. At line 17, the value $ct_0$ and h are checked to verify their values are proper. Then at Line 19, the round counter $\kappa$ is incremented as discussed above. Finally, the algorithm returns to Line 5 if any of the checks in Line 13 or Line 17 fail. As these checks are only performed on public values, faults on them cannot lead back to secret-key information.

---

Algorithm 1 - Dilithium signature generation

Require: Secret key sk and a message M.
Ensure: Signature $\sigma$ = Sign(sk, M).

1:    $A \in R_q^{k \times \ell}$ := ExpandA($\rho$)      ▷ A is generated in NTT domain as $\hat{A}$
2:    $\mu \in \{0,1\}^{512}$ := H(tr ∥ M)
3:    $\kappa$ := 0, (z, h) := $\perp$
4:    $\rho' \in \{0,1\}^{512}$ := H(K ∥ $\mu$) (or $\rho' \leftarrow \{0,1\}^{512}$ for randomizing signing)
5:    while (z, h) = $\perp$ do      ▷Pre-compute $\hat{s}_1$ := NTT($s_1$), $\hat{s}_2$ := NTT($s_2$), and $\hat{t}_0$: NTT($t_0$)
6:      $y \in S_{\gamma_1}^\ell$ := ExpandMask($\rho'$, $\kappa$)
7:      w := Ay ▷ w := $NTT^{-1}(\hat{A} \cdot NTT(y))$
8:      $w_1$ := HighBits$_q$(w, 2$\gamma_2$)
9:      $\tilde{c} \in \{0,1\}^{256}$ := H($\mu$ ∥ $w_1$)
10:    $c \in B_\tau$ := SampleInBall($\tilde{c}$)      ▷Store c in NTT representation as $\hat{c}$ = NTT(c)
11:    z := y + c$s_1$      ▷Compute c$s_1$ as $NTT^{-1}(\hat{c} \cdot \hat{s}_1)$
12:    $r_0$ := LowBits$_q$(w − c$s_2$, 2$\gamma_2$)      ▷Compute c$s_2$ as $NTT^{-1}(\hat{c} \cdot \hat{s}_2)$ -continued Algorithm 1 - Dilithium signature generation

```
13:      if ||z||∞ ≥ γ₁ - β or ||r₀||∞ ≥ γ₂ - β then
14:          (z, h): =⊥
15:      else
16:          h: = MakeHint_q(-ct₀, w - cs₂ + ct₀, 2γ₂)       ▷Compute ct₀ as NTT⁻¹(ĉ · t₀)
17:          if ||ct₀||∞ ≥ γ₂ or the # of 1's in h is greater than ω then
18:              (z, h): =⊥
19:      κ: = κ + ℓ
20:
21:  return σ = (c̃, z, h)
```

TABLE 2

| NIST security level | 2 | 3 | 5 |
|---|---|---|---|
| q [modulus] | 8380417 | 8380417 | 8380417 |
| (k, l) [dimensions of A] | (4, 4) | (6, 5) | (8, 7) |
| η [secret key range] | 2 | 4 | 2 |
| τ [hamming weight of c] | 39 | 49 | 60 |
| d [dropped bits from t] | 13 | 13 | 13 |
| γ₁ [y coefficient range] | $2^{17}$ | $2^{19}$ | $2^{19}$ |
| γ₂ [low-order rounding range] | (q - 1)/88 | (q - 1)/32 | (q - 1)/32 |
| β [range of cs₁ and cs₂] | 78 | 196 | 120 |
| public key size (bytes) | 1312 | 1952 | 2592 |
| secret key size (bytes) | 2528 | 4000 | 4864 |
| signature size (bytes) | 2420 | 3293 | 4595 |

The probability that any polynomial of z passes the range check in Line 13 is about 0.86, 0.91 and 0.94 for Dilithium with NIST security level 2, Dilithium with NIST security level 3, and Dilithium with NIST security level 5, respectively. The probability that any polynomial of $r_0$ passes the range check is about 0.81, 0.83, 0.89 for Dilithium with NIST security level 2, Dilithium with NIST security level 3, and Dilithium with NIST security level 5, respectively. The probability that all checks pass is approximately 0.23, 0.20 and 0.26 for the three parameter sets, respectively. Therefore, the number of rounds follows a geometric distribution with p≈0.23, p≈0.20 or p≈0.26. The (approximate) average number 1/p of required rounds for Dilithium with NIST security level 2 is 4.25, for Dilithium with NIST security level 3 is 5.11 and for Dilithium with NIST security level 5 is 3.85. However, the standard deviation $\sqrt{(1-p)}/p$ of a geometric distribution is 3.7 for Dilithium with NIST security level 2, 4.6 for Dilithium with NIST security level 3 and 3.3 for Dilithium with NIST security level 5. This shows that on average several rounds are required, with non-negligible probabilities that even 10 or more rounds are necessary. As such, if computations are only required in a final round there is a significant benefit because if any faults are injected in the earlier rounds, this signature is not relevant because it has been rejected, so no secret information can be leaked from the earlier rounds.

In order to detect faults, once a valid signature is generated, the last round is repeated, and the results of the repeated round are compared to the last round. If they are the same, this means that no single faults were injected. If the final round is recomputed to verify the output against the already generated (intermediate) signature, then all inputs to the final round have to be guaranteed. In particular, this means that integrity of the secret key sk and message M must be guaranteed. This may be done by simply adding some redundancy like a cyclic redundancy check (CRC) to the input parameters. This may be verified in each round, but it also suffices to only verify this on the final round (detecting any faults only at that point). Besides the inputs, it should be guaranteed that the final round is in fact the correct round: this may be ensured by providing integrity of the seed ρ' and the round counter κ. The round counter κ is updated at Line 19 by a value ℓ if a valid signature is not generated. The value ℓ is set based upon the specified security level (see Table 1). The round counter κ used to generate the value of y at Line 6. So by changing the value of the round counter κ each round a different signature will be generated. For deterministic signing, the seed ρ'=H(K∥μ) depends on the message digest μ=H(tr∥M). Assuming the integrity on M, tr, and K (the latter two are part of the secret key) via a CRC check, the integrity of the hash function calls has to be guaranteed. This may for example be achieved via re-computation, and only needs to be done once.

As long as there is simple control-flow protection in each round that ensures that κ is incremented if and only if a next round is started, κ may be used to re-compute the last round in which all range checks pass. Note that this is not necessarily the correct last round, as an attacker can fault that round so that it will be skipped. This allows an adversary to generate multiple signatures on a single message. As this mimics the situation of randomized signatures, it does not lead to any attacks. An implementation can limit the number of rounds that is attempted before aborting, limiting the number of signatures that may be generated to a few hundred in the worst case (but much fewer on average, and a few dozens in the worst case by allowing a small failure probability). The probability that so many attempts are necessary becomes negligible at that point.

In the last round it is assumed that a candidate signature (c̃, z, h) is computed at round κ, with secret key sk on message M. The goal of the final round is to guarantee that σ=Sign_{sk}(M)=(c̃, z, h). By the integrity guarantee on κ, ρ', and sk in the initial rounds, it suffices to only re-compute the final round. Under the assumption that it is hard to introduce the same fault twice at exactly the same point, the last round may be recomputed, and the output is verified to be the same between the two iterations. This achieves the same protection as re-computing the signature completely from scratch. Further, to scale to multiple injected faults, the final round may be re-computed multiple times to achieve the same protection as re-computing a complete signature just as many times.

Alternatively, the final round may be performed with a more granular selection of integrity checks. This can include many countermeasures, including but not necessarily limited to:

re-computing the hash digest H(tr∥M) to ensure the correct message is signed;
  storing CRCs of matrix elements to ensure that correct polynomials of A are generated;
  re-computing ExpandMask(ρ', κ) to ensure no bit flips occur in y;

re-computing $\tilde{c}=H(\mu\|w_1)$ to ensure no bitflips in the challenge (seed) occur;

re-computing c=SampleInBall($\tilde{c}$) to ensure no bitflips in the challenge occur;

preventing loop abort faults; and preventing general instruction skipping.

As mentioned above, which countermeasures are required depends on the chosen platform and the exact attacker scenario.

Figure 1:
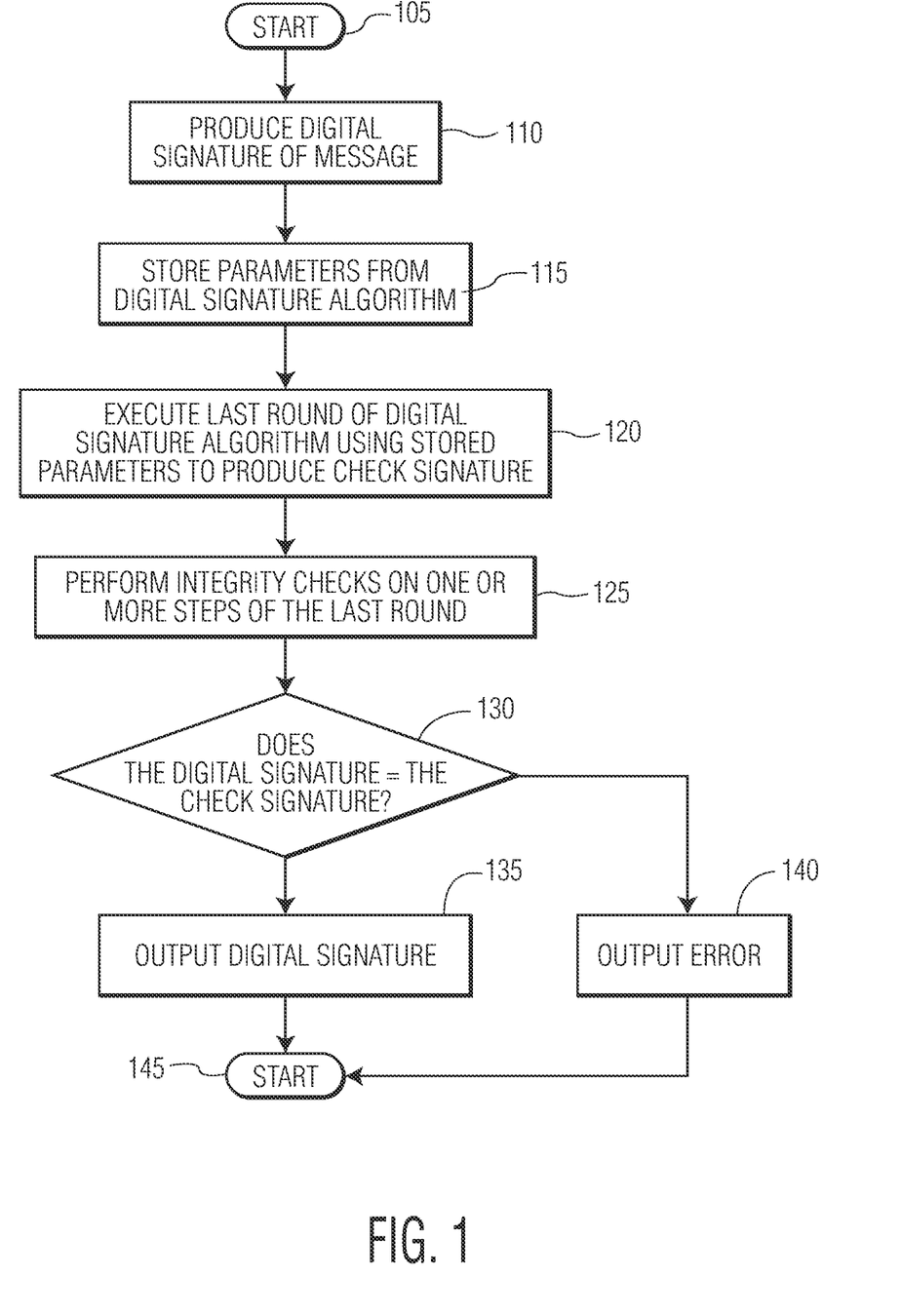
FIG. 1 illustrates a flow diagram of the digital signature fault check method.

FIG. 1 illustrates a flow diagram of the digital signature fault check method. The fault check method 100 begins at 105, and then produces a digital signature of the message 110. As described above, determining a final digital signature may require multiple rounds, until various parameters are within certain bounds. Algorithm 1 above illustrates the process of generating such a digital signature, but other digital signature methods may also be used that have a number of rounds. Once the digital signature has been generated, the fault check method 100 stores parameters from the digital signature algorithm 115. These parameters may include the state parameters from the last round of processing for the digital signature. In the example of Dilithium from above, such parameters may include the round counter κ and seed ρ'. Next, the fault check method 100 executes the last round of the digital signature algorithm using the stored parameters to produce a check signature 120. Because the state parameters for the last round were stored, these may be used to execute a round of the digital signature that is the same as the last round. Next, the fault check method 100 may perform integrity checks on one or more of the steps of the last round. The various checks that may be performed are described above and ensure that the re-execution of the last round has not been compromised. Then the fault check method 100 determines if the digital signature produced at 110 matches the check signature. If not, then an error is output 140. If so, then the digital signature is output 135. The method then ends at 145. It is noted that steps 120 and 125 may be repeated multiple time to account for multiple faults. Then at step 130 each of the multiple check signatures would be compared to the digital signature.

Figure 2:
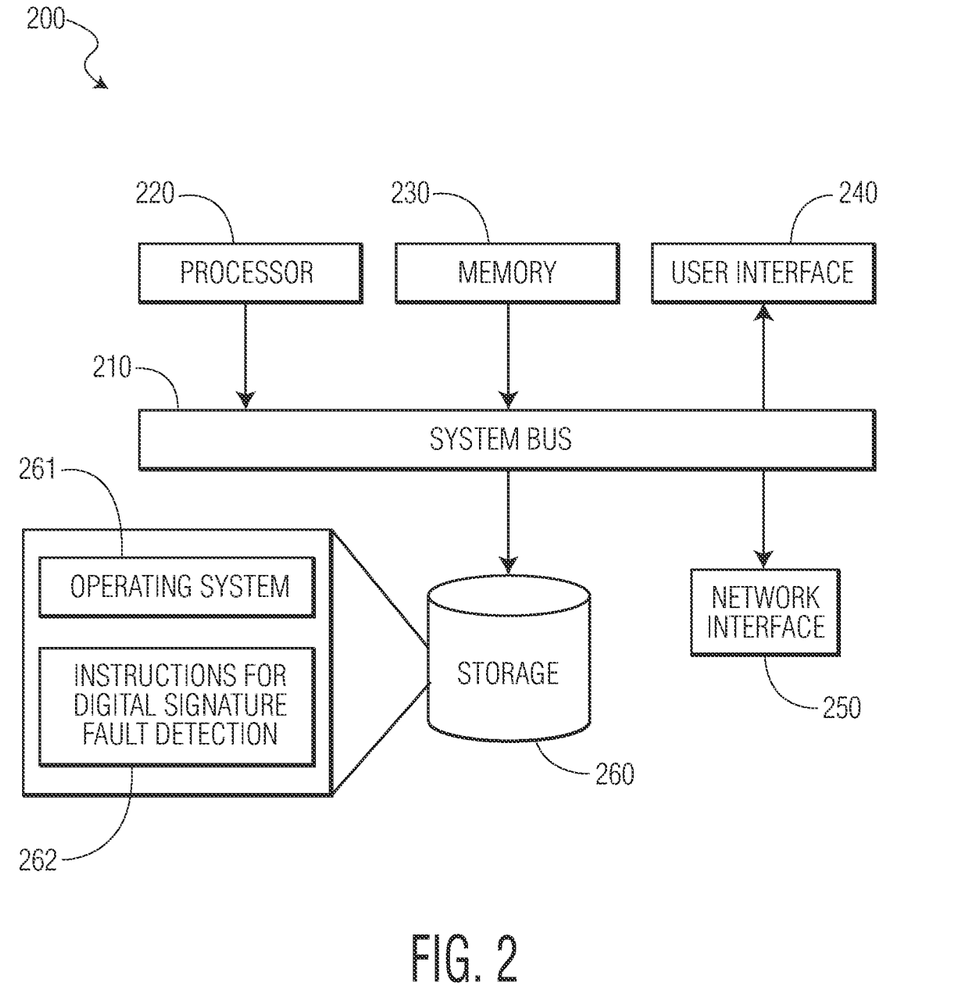
FIG. 2 illustrates an exemplary hardware diagram for implementing a digital signature fault detection method.

FIG. 2 illustrates an exemplary hardware diagram 200 for implementing a digital signature fault detection method. As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, microcontroller, graphics processing unit (GPU), neural network processor, field programmable gate array (FPGA), application-specific integrated circuit (ASIC), or other similar devices.

The memory 230 may include various memories such as, for example L1, L2, or L3 cache or system memory. As such, the memory 230 may include static random-access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a touch interface, a mouse, and/or a keyboard for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol or other communications protocols, including wireless protocols. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. Storage 262 may include instructions for carrying out digital signature fault detection method described herein.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

The system bus 210 allows communication between the processor 220, memory 230, user interface 220, storage 260, and network interface 250.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system, the various hardware components may belong to separate physical systems. For example, the processor 220 may include a first processor in a first server and a second processor in a second server.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A data processing system comprising instructions embodied in a non-transitory computer readable medium, the instructions for a fault detection in a digital signature algorithm in a processor, the instructions, comprising:
    producing a digital signature of a message using a digital signature algorithm;
    storing parameters from a last round of the digital signature algorithm;
    executing the last round of the digital signature algorithm using the stored parameters to produce a check signature;
    comparing the digital signature to the check signature; and
    outputting the digital signature when the digital signature is the same as the check signature.

2. The data processing system of claim 1, wherein the instructions further comprise:
    outputting an error when the digital signature is not the same as the check signature.

3. The data processing system of claim 1, wherein the stored parameters include a round counter and a seed.

4. The data processing system of claim 1, wherein the signature algorithm is a Dilithium digital signature algorithm.

5. The data processing system of claim 1, wherein the instructions further comprise:
    performing an integrity check on one or more steps of the execution of the last round of the digital signature algorithm.

6. The data processing system of claim 5, wherein performing an integrity check includes re-computing a hash digest of the message.

7. The data processing system of claim 5, wherein performing an integrity check includes storing cyclic redundancy checks of matrix elements used in the digital signature algorithm.

8. The data processing system of claim 5, wherein performing an integrity check includes recomputing an ephemeral secret using the stored parameters of a round counter and a seed.

9. The data processing system of claim 5, wherein performing an integrity check includes re-computing a challenge.

10. The data processing system of claim 5, wherein performing an integrity check includes re-computing a polynomial representation of a challenge.

11. The data processing system of claim 5, wherein performing an integrity check includes preventing loop abort faults.

12. The data processing system of claim 5, wherein performing an integrity check includes preventing general instruction skipping.

13. The data processing system of claim 1, wherein
    executing the last round of the digital signature algorithm using the stored parameters to produce a check signature is executed multiple times to produce multiple check signatures,
    comparing the digital signature to the check signature is repeated multiple times for each of the multiple check signatures, and
    outputting the digital signature when the digital signature is the same as the check signature includes outputting the digital signature when the digital signature is the same as each of the multiple check signatures.

14. A fault detection method for a digital signature algorithm, comprising:
    producing a digital signature of a message using a digital signature algorithm;
    storing parameters from a last round of the digital signature algorithm;
    executing the last round of the digital signature algorithm using the stored parameters to produce a check signature;
    comparing the digital signature to the check signature; and
    outputting the digital signature when the digital signature is the same as the check signature.

15. The method of claim 14, further comprising:
    outputting an error when the digital signature is not the same as the check signature.

16. The method of claim 14, wherein the stored parameters include a round counter and a seed.

17. The method of claim 14, wherein the signature algorithm is a Dilithium digital signature algorithm.

18. The method of claim 14, further comprising:
    performing an integrity check on one or more steps of the execution of the last round of the digital signature algorithm.

19. The method of claim 18, wherein performing an integrity check includes re-computing a hash digest of the message.

20. The method of claim 18, wherein performing an integrity check includes storing cyclic redundancy checks of matrix elements used in the digital signature algorithm.

21. The method of claim 18, wherein performing an integrity check includes recomputing an ephemeral secret using the stored parameters of a round counter and a seed.

22. The method of claim 18, wherein performing an integrity check includes re-computing a challenge.

23. The method of claim 18, wherein performing an integrity check includes re-computing a polynomial representation of a challenge.

24. The method of claim 18, wherein performing an integrity check includes preventing loop abort faults.

25. The method of claim 18, wherein performing an integrity check includes preventing general instruction skipping.

26. The method of claim 14, wherein
executing the last round of the digital signature algorithm using the stored parameters to produce a check signature is executed multiple times to produce multiple check signatures,
comparing the digital signature to the check signature is repeated multiple times for each of the multiple check signatures, and
outputting the digital signature when the digital signature is the same as the check signature includes outputting the digital signature when the digital signature is the same as each of the multiple check signatures.

* * * * *